UNITED STATES PATENT OFFICE.

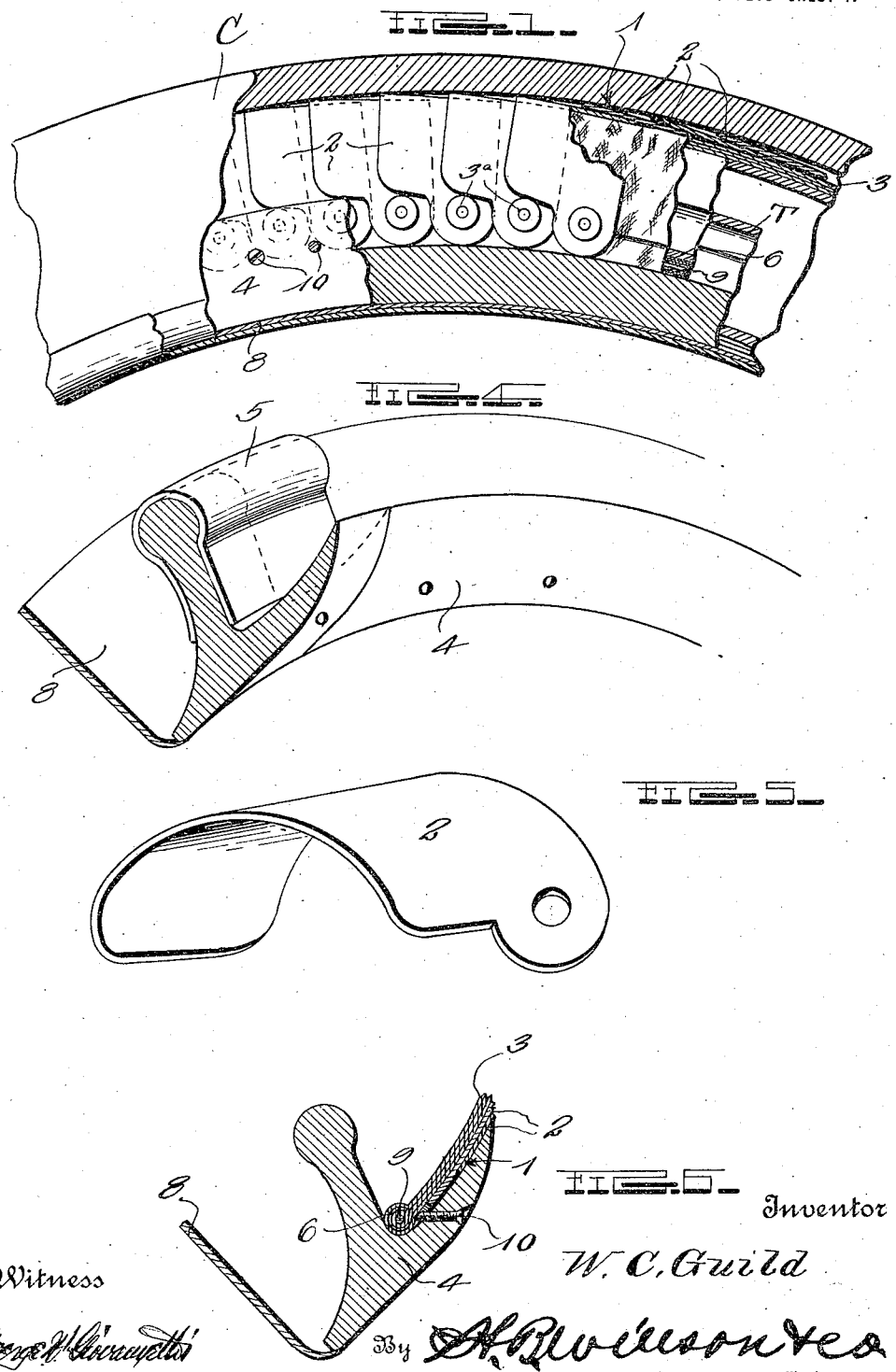

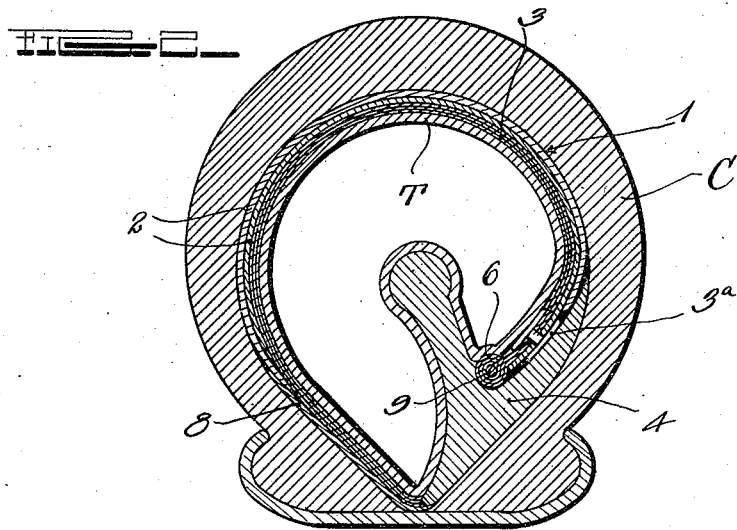
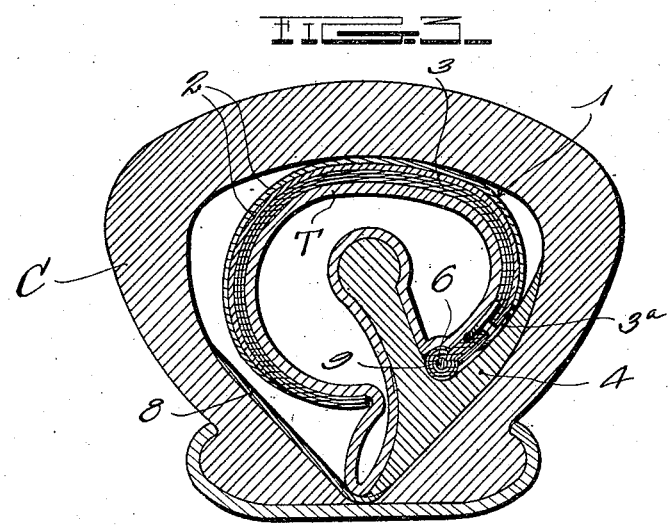

WALTER C. GUILD, OF MARIONVILLE, MISSOURI.

INNER-TUBE PROTECTOR.

1,420,655. Specification of Letters Patent. Patented June 27, 1922.

Application filed July 18, 1921. Serial No. 485,554.

*To all whom it may concern:*

Be it known that I, WALTER C. GUILD, a citizen of the United States, residing at Marionville, in the county of Lawrence and State of Missouri, have invented certain new and useful Improvements in Inner-Tube Protectors; and I do declare the following to be a full, clear, and exact description of the invention, such as will enable others skilled in the art to which it appertains to make and use the same.

This invention relates to an improved protector for inner tubes, the same being designed for disposition between the tube and the casing of a pneumatic tire and being sufficiently resilient to allow the tire to be inflated to its fullest extent, and being advantageous in that it absolutely prevents puncture of the tube, blowouts, and rim-cuts.

The principal object of the invention is to improve upon devices of this class by the provision of one which is in the form of a highly resilient metallic armor which is composed of a plurality of over-lapping relatively movable sections shaped to conform to the internal shape of the casing, together with novel anchoring means arranged in the latter and associated with the metallic sections to prevent possible relative displacement of the latter as well as creeping or disarrangement in any other manner.

Another and important object of the invention is to provide a protecting device of this class adapted for disposition between the tube and casing, the same being such in construction that there is little or no chance of the metallic sections of the armor becoming crushed in case the tire becomes deflated.

A further object of the invention is to provide protecting structure of the type set forth which is such that it does not require the use of special tires, it being adapted for use in connection with conventional types of pneumatic tires such as are now used on automobiles and being easily removed from a worn casing and readily insertable into a new one.

Other objects, advantages and features of the invention will become apparent during the course of the following description.

In the accompanying drawings forming a part of this specification and in which like numerals are employed to designate like parts throughout the same:

Figure 1 is a sectional view of a portion of a pneumatic tire equipped with a tube protecting device constructed in accordance with this invention, parts of such device being shown in section and elevation to illustrate the construction and arrangement more clearly.

Figure 2 is an enlarged transverse section through the tire and protecting device showing the tire inflated.

Figure 3 is a similar view showing the tire deflated and illustrating the approximate position of the parts of the protecting device at this time.

Figure 4 is a perspective view of one end of the anchoring ring and brace therefor showing the clip for connecting the ends of said ring.

Figure 5 is a detailed perspective view of one of the armor sections.

Figure 6 is a sectional view of the anchor and brace showing the manner in which the armor is connected to the anchor.

In carrying out the invention I make use of a highly resilient metallic armor which is designated as a whole by the numeral 1, the same being adapted as before indicated, to be interposed between the tube and casing for the purpose of preventing puncturing of the tube and preventing injuring thereof from blow-outs in the casing. This armor could, of course, be constructed otherwise, but in its preferred form it is composed of a plurality of arcuate spring metal sections 2, the adjacent ones of which are arranged in overlapping relation, having one of their ends free and their other ends pivotally connected at 3ª to the tube protecting fabric 3 which is in turn connected to what may be conveniently termed an anchoring member 4. This anchoring member, like the armor, is designed for disposition between the tube and casing and the tube when it is inflated, snugly conforms to the portion of the anchor against which it bears. This anchor in its preferred form is a substantially V-shaped split ring. By "split ring," I mean one which has its ends disconnected. In view of the fact that the ends are so disconnected I prefer to employ a U-shaped metal clip 5 for connecting these ends together when the device is in operative position inside of the casing. This clip is such that it can be slid to such a position as to permit the ends of the anchoring ring to be easily disconnected when it is desired to remove such parts from a worn casing and place it into a new casing. Employment of the aforesaid substantially V-shaped anchoring ring provides a pocket and it is in this pocket that the connected or anchored ends of the aforesaid layers of fabric are connected and properly held between the divergent portions of said ring. It is to be noted that the lower edges of the layers of fabric material are rolled or folded as indicated at 6 around a reinforcing wire 9 and set-screws 10 pass at right angles through one of the wings of the member 4 and bind the rolled portion against the other wing and in this way prevent circumferential slipping of the fabric materials. The aforesaid protective fabric extends entirely around the inner sides of the armor sections and beyond the free ends thereof and in this way prevents direct contact of the portions of the metallic parts of the protecting device with the tube. It is to be stated here that the armor sections are constructed of highly resilient steel preferably, while the anchoring ring 4 is preferably formed of aluminum steel alloy which insures strength and decreases the weight to the lowest possible extent. By forming the armor sections of highly resilient steel, the inherent resiliency thereof causes the free ends to automatically approach the anchoring ring 4 when the tube is deflated, this being disclosed in Fig. 3 and being very advantageous in that it serves to prevent possible crushing of the armor sections. At the same time, it prevents the free ends of these sections from possibly injuring the inner tube, as may otherwise occur.

The device also includes a laterally disposed bracing and supporting plate or ring 8 for the anchoring ring 4, this thin sheet steel ring being brazed to said anchoring ring and being directed at the angle shown so as to rest against the inclined inner wall of the casing, opposite to that against which the anchoring ring rests. This ring serves in one instance to reinforce that portion of the casing against which it bears and also functions to prevent the free ends of the metal armor sections from directly contacting and subjecting the latter to much unnecessary wear.

By carefully considering the foregoing description in connection with the drawings, it will be seen that I have devised novel metallic armor for arrangement between the inner tube and the casing so as to prevent puncturing of the tube and that this armor is so constructed that the sections thereof are freely movable with respect to each other so as to accommodate all movements of the tire regardless of what kind of obstruction is encountered. Hence, the resiliency of the tire is not impaired by the use of my improved device. As a matter of fact, it is much enhanced. Not only are punctures prevented by this armor, but rim-cuts are prevented in view of the fact that the employment of the bracing device 8 and anchoring ring 4 catches the weight directly under the spokes and so holds the weight up off the rim. Also the tire cannot flatten to an excessive degree even though the air is out of the inner tube, that is, when the tire is deflated.

By preventing the casing from flattening to an undesirable degree, I believe that I have overcome an important disadvantage usually found in prior patented devices of this class. Furthermore, in addition to protecting the air tube by use of this device, the parts of the latter co-act being double thick, lapped in such a way as to protect each other and prevent relative displacements and disarrangements and at the same time prevent possible crushing of the armor sections by holding the weight of the car on the anchor ring. These and other advantages and features of the invention have, no doubt, become apparent from the foregoing description. In view of this, a more lengthy and detailed description is thought unnecessary.

The form of the invention described is preferred. However, changes in shape and size may be resorted to if desired, so long as no departure from the claims is made.

I claim:

1. A protector for the inner tube of a pneumatic tire comprising a substantially V-shaped anchoring ring for disposition inside of the casing, one side of said ring being adapted to bear against one side wall of the casing adjacent the bead, and a metallic armor for the inner tube adapted for disposition between the latter and casing, said armor being made up of a plurality of arcuate resilient sections arranged in overlapping relation and being movable with respect to one another, said sections being movably connected at one of their ends with said anchoring ring, the opposite ends of said sections being free, whereby they will approach said ring when the tire is deflated to prevent crushing of said sections.

2. A protector for the inner tube of a pneumatic tire comprising a flexible armor for disposition between the casing and tube, being composed of a plurality of overlapping arcuate metallic sections, a fabric tube protector covering for disposition between the tube and sections to prevent direct contact of the latter with the former, pivots connecting one end of the sections with said covering, a split anchoring ring to which the fabric is connected, a clip for connecting the free ends of said ring together, and a device for maintaining said ring in its proper place.

3. An inner tube protecting device for pneumatic tires comprising a metallic armor for disposition between the casing and tube, being composed of arcuate resilient sections arranged in overlapping relation, a substantially V-shaped split anchoring ring for disposition between the inner portions of the tube and casing, being designed to bear against one side of the latter, a laterally disposed bracing member connected to the ring, being designed to bear against one side of the latter, a laterally disposed bracing member connected to the ring, being designed to bear against an opposite side of the casing so as to prevent displacement of said ring, a fabric tube protector arranged against the inner faces of the armor sections, one of the ends of the latter being pivotally connected to said fabric and the opposite ends being free.

In testimony whereof I have hereunto set my hand.

WALTER C. GUILD.